United States Patent
Kang et al.

(10) Patent No.: US 10,407,521 B2
(45) Date of Patent: Sep. 10, 2019

(54) POLYMER AND POLYMER ELECTROLYTE MEMBRANE COMPRISING SAME

(71) Applicant: LG CHEM, LTD., Seoul (KR)

(72) Inventors: Esder Kang, Daejeon (KR); Hyun Woog Ryu, Daejeon (KR); Joong Jin Han, Daejeon (KR); Youngjea Kim, Daejeon (KR); Sehee Jung, Daejeon (KR); Yong Jin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 118 days.

(21) Appl. No.: 15/531,662

(22) PCT Filed: Dec. 4, 2015

(86) PCT No.: PCT/KR2015/013213
§ 371 (c)(1),
(2) Date: May 30, 2017

(87) PCT Pub. No.: WO2016/089156
PCT Pub. Date: Jun. 9, 2016

(65) Prior Publication Data
US 2017/0327607 A1  Nov. 16, 2017

(30) Foreign Application Priority Data
Dec. 4, 2014 (KR) .................. 10-2014-0173142

(51) Int. Cl.
*H01M 8/1023* (2016.01)
*H01M 8/18* (2006.01)
(Continued)

(52) U.S. Cl.
CPC .............. *C08F 14/00* (2013.01); *C08F 28/02* (2013.01); *C08G 61/02* (2013.01); *C08G 61/12* (2013.01); *C08G 65/40* (2013.01); *C08G 65/48* (2013.01); *C08J 5/22* (2013.01); *C08L 65/00* (2013.01); *C08L 71/12* (2013.01); *H01M 8/1023* (2013.01); *H01M 8/1025* (2013.01);
(Continued)

(58) Field of Classification Search
CPC ...... H01M 6/18; H01M 10/0565; H01M 8/02; C08F 28/02; C08F 14/00
See application file for complete search history.

(56) References Cited

U.S. PATENT DOCUMENTS 7,807,759 B2   10/2010   Shin et al.
9,136,551 B2    9/2015   Kwon et al.
(Continued)

FOREIGN PATENT DOCUMENTS

EP   2270104 A1   1/2011
JP   2003-234014 A   8/2003
(Continued)

OTHER PUBLICATIONS

Extended European Search Report dated Mar. 28, 2018 for Application No. 15865281.8.
(Continued)

*Primary Examiner* — Kenneth J Douyette
(74) *Attorney, Agent, or Firm* — Birch, Stewart, Kolasch & Birch, LLP

(57) ABSTRACT

The present specification relates to a polymer and a polymer electrolyte membrane including the same.

16 Claims, 3 Drawing Sheets

(51) Int. Cl.
    *H01M 6/18*     (2006.01)
    *H01M 10/0565*     (2010.01)
    *C08F 14/00*     (2006.01)
    *C08F 28/02*     (2006.01)
    *C08J 5/22*     (2006.01)
    *C08G 61/02*     (2006.01)
    *C08G 61/12*     (2006.01)
    *C08G 65/40*     (2006.01)
    *C08G 65/48*     (2006.01)
    *C08L 65/00*     (2006.01)
    *C08L 71/12*     (2006.01)
    *H01M 8/1025*     (2016.01)
    *H01M 8/1039*     (2016.01)
    *H01M 8/1053*     (2016.01)
    *H01M 8/1018*     (2016.01)

(52) U.S. Cl.
CPC ....... *H01M 8/1039* (2013.01); *H01M 8/1053* (2013.01); *H01M 8/188* (2013.01); *H01M 6/188* (2013.01); *H01M 10/0565* (2013.01); *H01M 2008/1095* (2013.01); *H01M 2300/0082* (2013.01); *Y02E 60/528* (2013.01)

(56) References Cited

U.S. PATENT DOCUMENTS

| | | | |
|---|---|---|---|
| 9,912,002 | B2 | 3/2018 | Kong |
| 2004/0048129 | A1* | 3/2004 | Taft, III ............. B01D 67/0079 521/27 |
| 2005/0031924 | A1 | 2/2005 | Shirono et al. |
| 2005/0053818 | A1 | 3/2005 | St-Arnaud et al. |
| 2006/0188768 | A1 | 8/2006 | Kanaoka et al. |
| 2008/0114149 | A1 | 5/2008 | Moore et al. |
| 2008/0114183 | A1 | 5/2008 | Moore et al. |
| 2009/0123641 | A1* | 5/2009 | Hadj Romdhane ...................... B01D 67/0009 427/58 |
| 2009/0163692 | A1 | 6/2009 | Moore et al. |
| 2010/0167100 | A1 | 7/2010 | Moore et al. |
| 2011/0020731 | A1 | 1/2011 | Yoshimura et al. |
| 2011/0059385 | A1 | 3/2011 | Kim et al. |
| 2011/0136040 | A1 | 6/2011 | Hwang et al. |
| 2012/0028138 | A1 | 2/2012 | Lee et al. |
| 2012/0052347 | A1* | 3/2012 | Wilson ................. H01M 8/0232 429/72 |
| 2014/0030573 | A1 | 1/2014 | Esswein et al. |
| 2014/0065512 | A1 | 3/2014 | Kwon et al. |
| 2014/0227627 | A1 | 8/2014 | He et al. |
| 2016/0260994 | A1 | 9/2016 | Kong |
| 2017/0338504 | A1 | 11/2017 | Kang et al. |

FOREIGN PATENT DOCUMENTS

| | | |
|---|---|---|
| JP | 2004-335231 A | 11/2004 |
| JP | 2006-228628 A | 8/2006 |
| JP | 2009-256654 A | 11/2009 |
| JP | 2011-57982 A | 3/2011 |
| JP | 2012-149259 A | 8/2012 |
| JP | 2013-218868 A | 10/2013 |
| KR | 10-2003-0076057 A | 9/2003 |
| KR | 10-2006-0071690 A | 6/2006 |
| KR | 10-2006-0100148 A | 9/2006 |
| KR | 10-2010-0076902 A | 7/2010 |
| KR | 10-2010-0084237 A | 7/2010 |
| KR | 10-2011-0063175 A | 6/2011 |
| KR | 10-2013-0062252 A | 6/2013 |
| KR | 10-2015-0048639 A | 5/2015 |
| WO | WO 2006/132144 A1 | 12/2006 |

OTHER PUBLICATIONS

Extended European Search Report dated Mar. 28, 2018 for Application No. 15866009.2.
Extended European Search Report dated Mar. 28, 2018 for Application No. 15866198.3.
Arvai et al., "New aryl-containing fluorinated sulfonic acids and their ammonium salts, useful as electrolytes for fuel cells or ionic liquids", Journal of Fluorine Chemistry, vol. 129, 2008, pp. 1029-1035.
International Search Report issued in PCT/KR2015/013202 (PCT/ISA/210), dated Apr. 6, 2016.
International Search Report issued in PCT/KR2015/013203 (PCT/ISA/210), dated Apr. 6, 2016.
International Search Report issued in PCT/KR2015/013206 (PCT/ISA/210), dated Apr. 7, 2016.
International Search Report issued in PCT/KR2015/013209 (PCT/ISA/210), dated Apr. 1, 2016.
International Search Report issued in PCT/KR2015/013213 (PCT/ISA/210), dated May 19, 2016.
International Search Report issued in PCT/KR2015/013218 (PCT/ISA/210), dated Apr. 8, 2016.
Paillard et al., "Electrochemical investigation of polymer electrolytes based on lithium 2-(phenylsulfanyl)-1,1,2,2-tetrafluoroethansulfonate", Electrochimica Acta, vol. 53, 2007, pp. 1439-1443.
Paillard et al., "Polymer electrolytes based on new aryl-containing lithium perfluorosulfonates", Journal of Fluorine Chemistry, vol. 134, 2012, pp. 72-76.
Toulgoat et al., "An Efficient Preparation of New Sulfonyl Fluorides and Lithium Sulfonates", The Journal of Organic Chemistry, vol. 72, No. 24, 2007, pp. 9046-9052.
Xu et al., "Highly Conductive Aromatic Ionomers with Perfluorosulfonic Acid Side Chains for Elevated Temperature Fuel Cells", Macromolecules, vol. 44, 2011, pp. 4605-4609.
U.S. Office Action for U.S. Appl. No. 15/531,702, dated Sep. 7, 2018.
European Search Report for Appl. No. 15865952.4 dated May 29, 2018.
U.S. Office Action for U.S. Appl. No. 15/531,584, dated Dec. 13, 2018.
U.S. Office Action for U.S. Appl. No. 15/531,670, dated Feb. 1, 2019.

* cited by examiner

[FIG. 1]
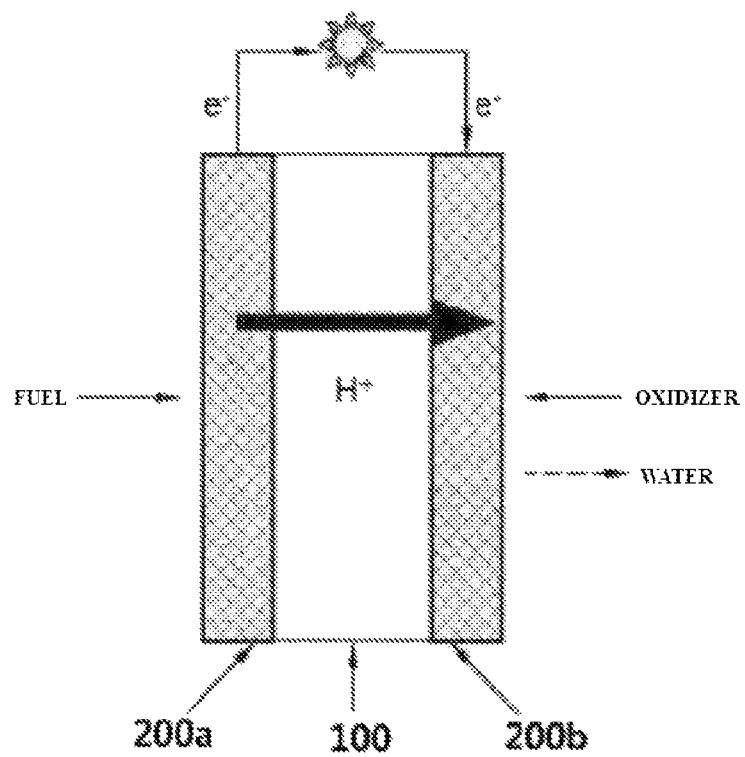

[FIG. 2]
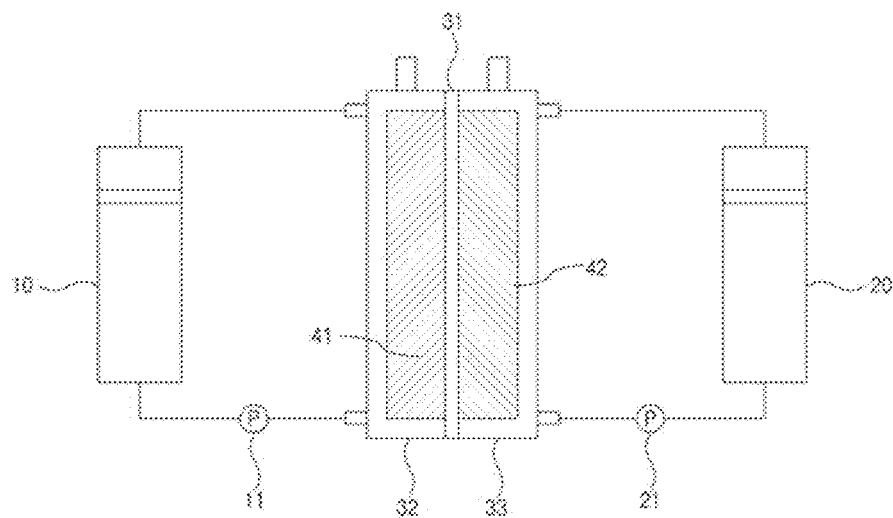
[FIG. 3]
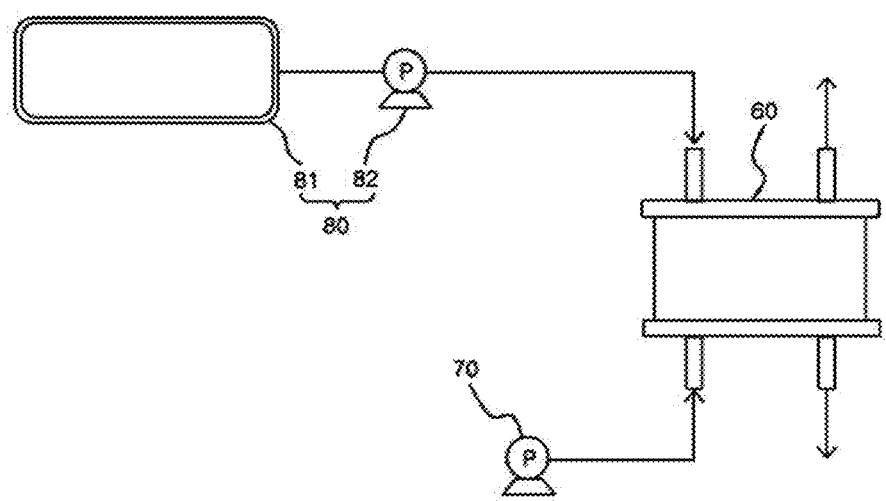

[FIG. 4]
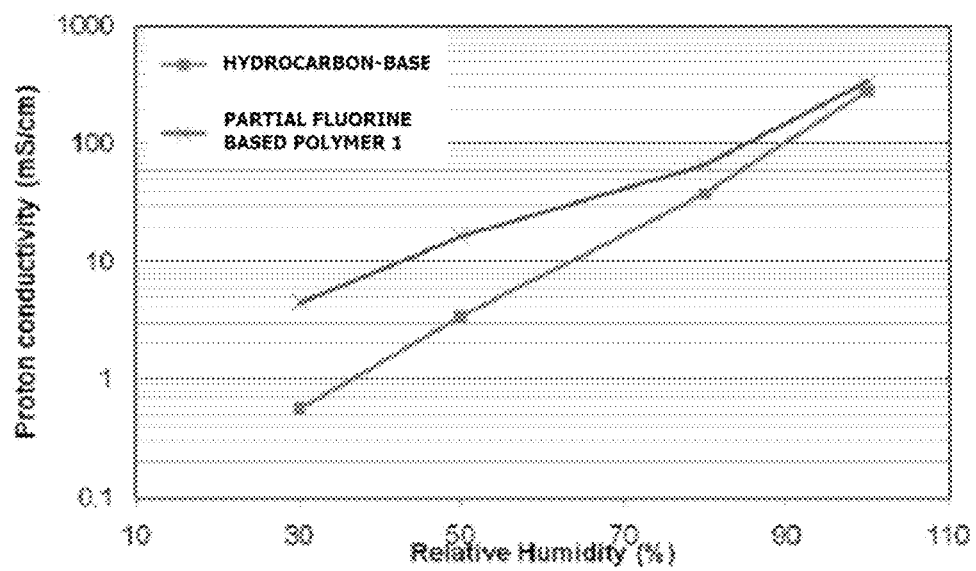
[FIG. 5]
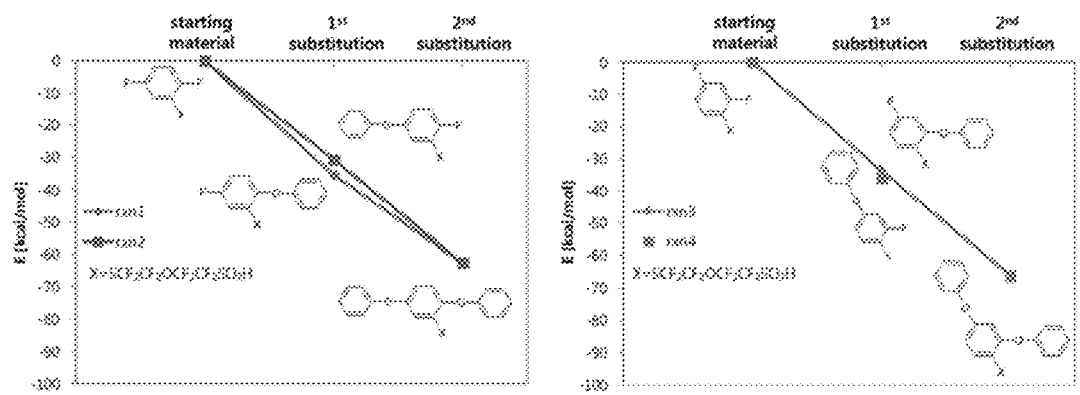

POLYMER AND POLYMER ELECTROLYTE MEMBRANE COMPRISING SAME

TECHNICAL FIELD

The present specification claims priority to and the benefits of Korean Patent Application No. 10-2014-0173142 filed with the Korean Intellectual Property Office on Dec. 4, 2014, the entire contents of which are incorporated herein by reference.

The present specification relates to a polymer and a polymer electrolyte membrane including the same.

BACKGROUND ART

A fuel cell is an energy conversion device directly converting chemical energy of fuel into electric energy. In other words, a fuel cell employs a power generation method utilizing a fuel gas and an oxidizer, and using electrons generated during an oxidation-reduction reaction thereof to produce power. A membrane-electrode assembly (MEA) of a fuel cell is a part where an electrochemical reaction of hydrogen and oxygen occurs, and is formed with a cathode, an anode and an electrolyte membrane, that is, an ion conductive electrolyte membrane.

A redox flow battery (oxidation-reduction flow battery) is a system charged and discharged by active materials included in a liquid electrolyte being oxidized and reduced, and is an electrochemical storage device directly storing chemical energy of the active materials as electric energy. A unit cell of the redox flow battery includes an electrode, an electrolyte and an ion-exchange membrane (electrolyte membrane).

Due to their high energy efficiency and environmental friendly properties of low contaminant emissions, fuel cells and redox flow batteries have been researched and developed as a next generation energy source.

A core constituent in a fuel cell and a redox flow battery is a polymer electrolyte membrane capable of cation exchange, and properties of 1) excellent proton conductivity, 2) preventing an electrolyte crossover, 3) high chemical resistance, 4) strengthening mechanical properties and/or 4) low swelling ratio are favorably required. The polymer electrolyte membrane is divided into fluorine-based, partial fluorine-based, hydrocarbon-based and the like, and a partial fluorine-based polymer electrolyte membrane has advantages of exhibiting excellent physical and chemical stability and high thermal stability by having a fluorine-based main chain. In addition, in the partial fluorine-based polymer electrolyte membrane, a cation transfer functional group is attached at the end of the fluorine-based chain as in a fluorine-based polymer electrolyte membrane, and therefore, advantages of both a hydrocarbon-based polymer electrolyte membrane and a fluorine-based polymer electrolyte membrane are capable of being obtained.

However, a partial fluorine-based polymer electrolyte membrane has a problem in that cation conductivity is relatively low since micro-phase separation and aggregation of a cation transfer functional group are not effectively controlled. Accordingly, researches have been progressed in the direction of securing high cation conductivity through controlling distribution and micro-phase separation of a sulfonic acid group.

PRIOR ART DOCUMENTS

Patent Documents

Korean Patent Application Laid-Open Publication No. 2003-0076057

DISCLOSURE

Technical Problem

The present specification is directed to providing a polymer and a polymer electrolyte membrane including the same.

Technical Solution

One embodiment of the present specification provides a random polymer including a unit represented by the following Chemical Formula 1; and a brancher derived from a compound represented by the following Chemical Formula 2 or a brancher represented by the following Chemical Formula 3.

[Chemical Formula 1]

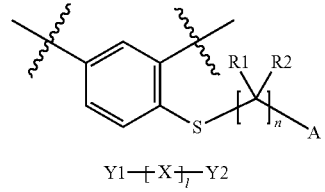

[Chemical Formula 2]

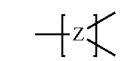

[Chemical Formula 3]

In Chemical Formulae 1 to 3,

A is $-SO_3H$, $-SO_3^-M^+$, $-COOH$, $-COO^-M^+$, $-PO_3H_2$, $-PO_3H^-M^+$, $-PO_3^{2-}2M^+$, $-O(CF_2)_mSO_3H$, $-O(CF_2)_mSO_3^-M^+$, $-O(CF_2)_mCOOH$, $-O(CF_2)_mCOO^-M^+$, $-O(CF_2)_mPO_3H_2$, $-O(CF_2)_mPO_3H^-M^+$ or $-O(CF_2)_mPO_3^{2-}2M^+$, m is an integer of 2 to 6, M is a group 1 element, R1 and R2 are the same as or different from each other, and each independently a halogen group, n is an integer of 2 to 10, and structures in the 2 to 10 parentheses are the same as or different from each other, X is S; O; CO; SO; $SO_2$; NR; a hydrocarbon-based or fluorine-based assembly, l is an integer of 0 to 10, when l is 2 or greater, two or more Xs are the same as or different from each other, Y1 and Y2 are the same as or different from each other, and each independently NRR; an aromatic ring in which one, two or more are substituted with substituents selected from the group consisting of a hydroxyl group and a halogen group; or an aliphatic ring in which one, two or more are substituted with substituents selected from the group consisting of a hydroxyl group and a halogen group, R is an aromatic ring substituted with a halogen group; or an aliphatic ring substituted with a halogen group, and Z is a trivalent organic group.

One embodiment of the present specification provides a polymer electrolyte membrane including the polymer.

One embodiment of the present specification provides a reinforced membrane including a substrate; and the polymer.

One embodiment of the present specification provides a membrane-electrode assembly including an anode; a cathode; and the polymer electrolyte membrane described above provided between the anode and the cathode.

One embodiment of the present specification provides a membrane-electrode assembly including an anode; a cathode; and the reinforced membrane described above provided between the anode and the cathode.

One embodiment of the present specification provides a polymer electrolyte-type fuel cell including two or more of the membrane-electrode assemblies described above; a stack including a bipolar plate provided between the membrane-electrode assemblies; a fuel supplying unit supplying fuel to the stack; and an oxidizer supplying unit supplying an oxidizer to the stack.

One embodiment of the present specification provides a redox flow battery including a positive electrode cell including a positive electrode and a positive electrode liquid electrolyte; a negative electrode cell including a negative electrode and a negative electrode liquid electrolyte; and the polymer electrolyte membrane described above provided between the positive electrode cell and the negative electrode cell.

Lastly, one embodiment of the present specification provides a redox flow battery including a positive electrode cell including a positive electrode and a positive electrode liquid electrolyte; a negative electrode cell including a negative electrode and a negative electrode liquid electrolyte; and the reinforced membrane described above provided between the positive electrode cell and the negative electrode cell.

Advantageous Effects

A polymer electrolyte membrane including a polymer according to one embodiment of the present specification readily forms a hydrophilic-hydrophobic phase separation structure.

In addition, by controlling the phase separation structure, the polymer electrolyte membrane efficiently forms a hydrophilic channel in the polymer electrolyte membrane.

The polymer electrolyte membrane also has excellent proton conductivity. As a result, high performance of a fuel cell and/or a redox flow battery including the same is obtained.

DESCRIPTION OF DRAWINGS

FIG. 1 is a schematic diagram showing a principle of electricity generation of a fuel cell.

FIG. 2 is a diagram schematically illustrating one embodiment of a redox flow battery.

FIG. 3 is a diagram schematically illustrating one embodiment of a fuel cell.

FIG. 4 is a diagram showing ion conductivity of an example and a comparative example.

FIG. 5 is a diagram showing reactivity depending on the bonding position of a polymer of the present disclosure.

REFERENCE NUMERAL

100: Electrolyte Membrane
200*a*: Anode
200*b*: Cathode
10, 20: Tank
11, 21: Pump
31: Electrolyte Membrane
32: Positive Electrode Cell
33: Negative Electrode Cell
41: Positive Electrode Liquid Electrolyte
42: Negative Electrode Liquid Electrolyte
60: Stack
70: Oxidizer Supplying Unit
80: Fuel Supplying Unit
81: Fuel Tank
82: Pump

MODE FOR DISCLOSURE

Hereinafter, the present specification will be described in more detail.

In the present specification, a description of a certain part "including" certain constituents means capable of further including other constituents, and does not exclude other constituents unless particularly stated on the contrary.

One embodiment of the present specification provides a random polymer including a unit represented by the following Chemical Formula 1; and a brancher derived from a compound represented by the following Chemical Formula 2 or a brancher represented by the following Chemical Formula 3.

In the present specification, an S atom is used as a linker of a [ ] structure and a benzene ring in Chemical Formula 1. In this case, an electron withdrawing character of the —$[CR1R2]_n$-A linked by the S atom allows the polymer to be readily formed, and a stable polymer may be provided.

In one embodiment of the present specification, R1 and R2 are the same as or different from each other, and each independently a halogen group. Specifically, R1 and R2 may be each independently selected from the group consisting of F; Cl; Br; and I.

When a polymer including the unit represented by Chemical Formula 1 of the present specification is included in a polymer electrolyte membrane and R1 and R2 of Chemical Formula 1 are a halogen group, there is an advantage in that electrons are favorably attracted facilitating hydrogen ion migration, and a structure of the polymer electrolyte membrane is strengthened. Specifically, according to one embodiment of the present specification, the advantage may be maximized when R1 and R2 are fluorine.

In one embodiment of the present specification, n is an integer of 2 to 10. In another embodiment of the present specification, n is an integer of 2 to 6.

In a monomer including the unit of Chemical Formula 1 according to one embodiment of the present specification, the number of n may be controlled. In this case, a length of the structure in the parenthesis may be controlled to perform a role of facilitating a phase separation phenomenon of the polymer electrolyte membrane, and hydrogen ion migration of the polymer electrolyte membrane may be facilitated.

In one embodiment of the present specification, n is 2.
In another embodiment, n is 3.
In another embodiment, n is 4.
In another embodiment, n is 5.
In another embodiment, n is 6.
In another embodiment, n is 7.
In one embodiment of the present specification, n is 8.
In another embodiment, n is 9.
In one embodiment of the present specification, n is 10.
In one embodiment of the present specification, A is —$SO_3H$ or —$SO_3^-M^+$.
In another embodiment, A is —$SO_3H$.

As described above, when A is —SO₃H or —SO₃⁻M⁺ in Chemical Formula 1, a chemically stable polymer may be formed.

In one embodiment of the present specification, M is a group 1 element.

In the present specification, the group 1 element may be Li, Na or K.

In one embodiment of the present specification, the unit represented by Chemical Formula 1 is represented by any one of the following Chemical Formulae 1-1 to 1-9.

[Chemical Formula 1-1]

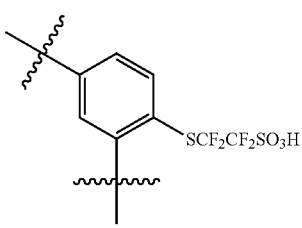

[Chemical Formula 1-2]

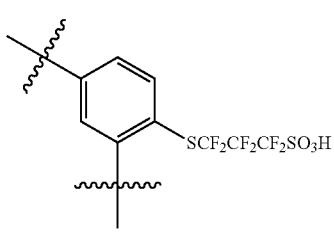

[Chemical Formula 1-3]

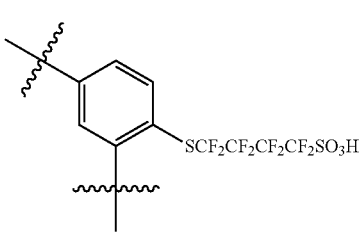

[Chemical Formula 1-4]

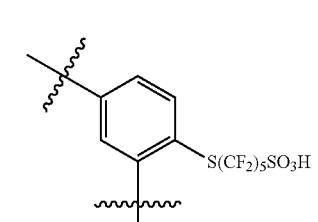

[Chemical Formula 1-5]

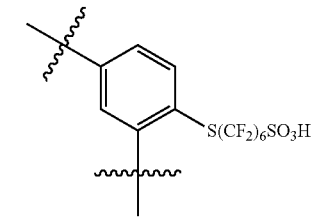

[Chemical Formula 1-6]

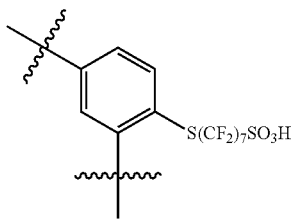

[Chemical Formula 1-7]

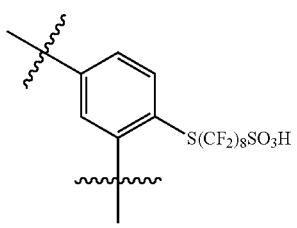

[Chemical Formula 1-8]

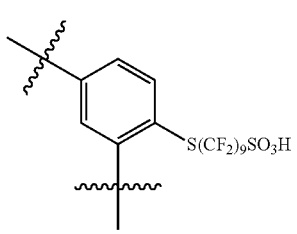

[Chemical Formula 1-9]

In one embodiment of the present specification, the polymer is a random polymer. In this case, polymers having a high molecular weight may be obtained using a simple polymerization method.

In one embodiment of the present specification, the polymer includes the unit represented by Chemical Formula 1 in 0.001% by weight to 10% by weight.

In one embodiment of the present specification, the brancher derived from a compound represented by Chemical Formula 2 or the brancher represented by Chemical Formula 3 is included in 0.001% by weight to 10% by weight. In this case, the content of the unit represented by Chemical Formula 1 and/or a unit different from the unit represented by Chemical Formula 1 is from 80% by weight to 99.8% by weight.

In the present specification, the unit different from the unit represented by Chemical Formula 1 may be selected from among units enhancing mechanical strength of the polymer, and types thereof are not limited as long as it is a unit capable of enhancing mechanical strength.

The unit represented by Chemical Formula 1 according to one embodiment of the present specification performs a role of controlling ion conductivity of a separator.

In one embodiment of the present specification, the random polymer includes a brancher. The brancher in the present specification performs a role of linking or crosslinking a polymer chain.

In the polymer including a brancher in the present specification, the brancher may directly form a main chain of the polymer, and a mechanical degree of integration of a thin membrane may be enhanced.

Examples of the substituents of the present specification are described below, however, the substituents are not limited thereto.

In the present specification,

means bonding to adjacent substituents or a main chain of the polymer.

In the present specification, the "derived" means producing new bonds as bonds of a compound are cut or substituents fall off, and the unit derived from the compound may mean a unit linked to a main chain of a polymer. The unit may form a polymer by being included in a main chain of the polymer.

Specifically, in the present specification, the brancher derived from a compound of Chemical Formula 2 may function as a brancher as, in each of Y1 and Y2 that are an aromatic ring substituted with a halogen group; or an aliphatic ring substituted with a halogen group, the halogen group falls off from the aromatic ring or the aliphatic ring. Specifically, the brancher derived from the compound of Chemical Formula 2 in the present specification may function as a brancher in the polymer as two or more halogen groups fall off.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

In the present specification, the hydrocarbon-based means an organic compound formed only with carbon and hydrogen, and includes linear, branched, cyclic hydrocarbon and the like, but is not limited thereto. In addition, a single bond, a double bond or a triple bond may be included, however, the hydrocarbon-based is not limited thereto.

In the present specification, the hydrocarbon-based may mean $CH_2$.

In the present specification, a fluorine-based assembly means a part or all of carbon-hydrogen bonds in the hydrocarbon-based are substituted with fluorine.

In the present specification, the aromatic ring may be an aromatic hydrocarbon ring or an aromatic heteroring, and may be monocyclic or multicyclic.

Specifically, examples of the aromatic hydrocarbon ring may include a monocyclic aromatic group such as a phenyl group, a biphenyl group and a terphenyl group, and a multicyclic aromatic group such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylene group and a fluoranthene group, but are not limited thereto.

In the present specification, the aromatic heteroring means a structure including one or more heteroatoms such as O, S, N and Se instead of a carbon atom in the aromatic hydrocarbon ring. Specific examples thereof may include a thiophene group, a furan group, a pyrrole group, an imidazole group, a thiazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a quinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group, a benzothiazolyl group, a phenothiazinyl group, a dibenzofuranyl group and the like, but are not limited thereto.

In the present specification, the aliphatic ring may be an aliphatic hydrocarbon ring or an aliphatic heteroring, and may be monocyclic or multicyclic. Examples of the aliphatic ring may include a cyclopentyl group, a cyclohexyl group and the like, but are not limited thereto.

In the present specification, the organic group may include an alkyl group, an alkenyl group, a cycloalkyl group, a cycloalkenyl group, an aryl group, an aralkyl group and the like. This organic group may include bonds or substituents in addition to a hydrocarbon group such as heteroatoms in the organic group. In addition, the organic group may be any of linear, branched or cyclic.

In the present specification, the trivalent organic group means a trivalent group having 3 binding sites in an organic compound.

In addition, the organic group may form a cyclic structure, and may form bonds including heteroatoms as long as it does not harm effects of the present disclosure.

Specifically, bonds including heteroatoms such as an oxygen atom, a nitrogen atom and a silicon atom may be included. Specific examples thereof may include ether bonds, thioether bonds, carbonyl bonds, thiocarbonyl bonds, ester bonds, amide bonds, urethane bonds, imino bonds (—N=C(-A)-, —C(=NA)-: A represents a hydrogen atom or an organic group), carbonate bonds, sulfonyl bonds, sulfinyl bonds, azo bonds and the like, but are not limited thereto.

Examples of the cyclic structure may include the aromatic ring, the aliphatic ring and the like described above, and the cyclic structure may be monocyclic or multicyclic.

In the present specification, the alkyl group may be linear or branched, and although not particularly limited thereto, the number of carbon atoms is preferably from 1 to 50. Specific examples thereof may include a methyl group, an ethyl group, a propyl group, an isopropyl group, a butyl group, a t-butyl group, a pentyl group, a hexyl group, a heptyl group and the like, but are not limited thereto.

In the present specification, the alkenyl group may be linear or branched, and although not particularly limited thereto, the number of carbon atoms is preferably from 2 to 40. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, the cycloalkyl group is not particularly limited, but preferably has 3 to 60 carbon atoms, and particularly, may include a cyclopentyl group, a cyclohexyl group and the like, but is not limited thereto.

In one embodiment of the present specification, 1 is 3 or greater.

In one embodiment of the present specification, X is S.

In another embodiment, X is a haloalkyl group.

In another embodiment, X is $CH_2$.

In another embodiment of the present specification, X is NR.

In one embodiment of the present specification, Y1 and Y2 are the same as or different from each other, and each independently a halogen-substituted aromatic ring.

In one embodiment of the present specification, Y1 and Y2 are the same as or different from each other, and each independently a fluorine-substituted aromatic hydrocarbon ring.

In one embodiment of the present specification, Y1 and Y2 are the same as or different from each other, and each independently NRR.

In another embodiment, Y1 and Y2 are each a fluorine-substituted phenyl group. Specifically, 2,4-phenyl, 2,6-phenyl, 2,3-phenyl, 3,4-phenyl and the like are included, however, Y1 and Y2 are not limited thereto.

In one embodiment of the present specification, the compound represented by Chemical Formula 2 may be represented by any one of the following structures.

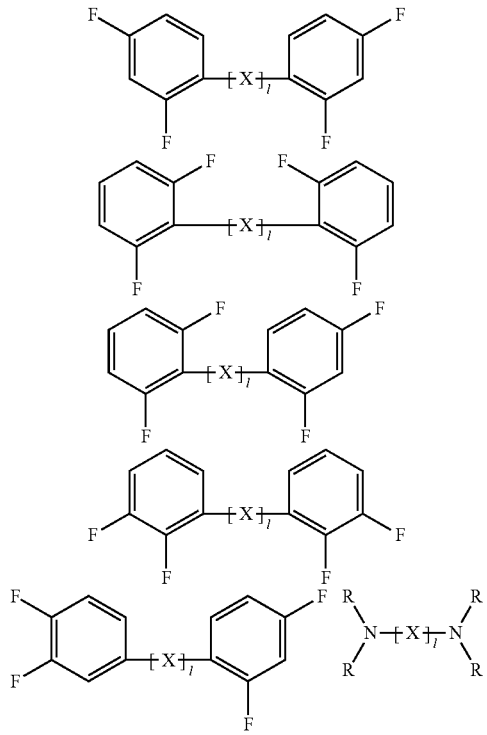

In the structures, definitions of X, l and R are the same as in Chemical Formula 2.

According to one embodiment of the present specification, Z in Chemical Formula 3 may be represented by any one of the following Chemical Formulae 3-1 to 3-4.

[Chemical Formula 3-1]

[Chemical Formula 3-2]

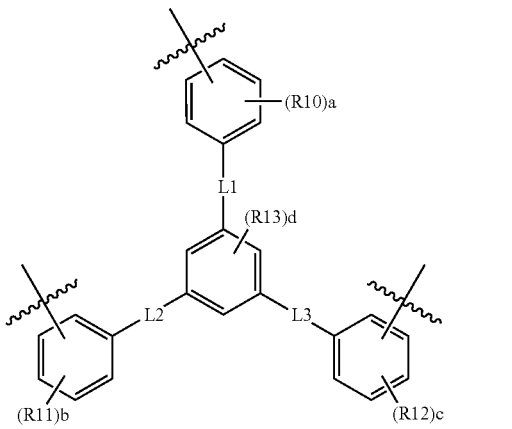

[Chemical Formula 3-3]

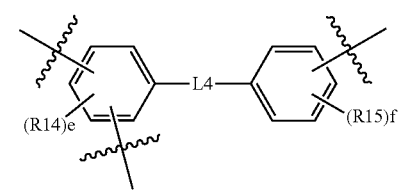

[Chemical Formula 3-4]

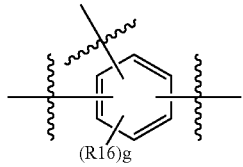

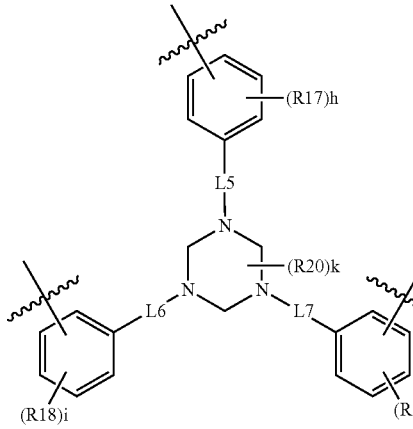

In Chemical Formulae 3-1 to 3-4,

L1 to L7 are the same as or different from each other, and each independently a direct bond; —S—; —O—; —CO—; or —$SO_2$—, R10 to R20 are the same as or different from each other, and each independently hydrogen; deuterium; a halogen group; a cyano group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted aryl group; or a substituted or unsubstituted heteroaryl group, a, b, c, f, h, i and j are each an integer of 1 to 4, d, e and g are each an integer of 1 to 3, k is an integer of 1 to 6, and when a, b, c, d, e, f, g, h, i, j and k are each an integer of 2 or greater, structures in the two or more parentheses are the same as or different from each other.

In one embodiment of the present specification, L1 is CO.

In another embodiment, L1 is $SO_2$.

In another embodiment, L1 is S.

In another embodiment, L2 is CO.

In another embodiment, L2 is $SO_2$.

In another embodiment, L2 is S.

In one embodiment of the present specification, L3 is CO.

In another embodiment, L3 is $SO_2$.

In another embodiment, L3 is S.

In one embodiment of the present specification, L4 is CO.

In another embodiment, L4 is $SO_2$.

In one embodiment of the present specification, L5 is a direct bond.

In another embodiment, L6 is a direct bond.

In one embodiment of the present specification, L7 is a direct bond.

In one embodiment of the present specification, R10 to R20 are hydrogen.

In one embodiment of the present specification, R16 is a halogen group.

In another embodiment, R16 is fluorine.

In addition, in one embodiment of the present specification, the brancher represented by Chemical Formula 3 may be represented by any one of the following structures.

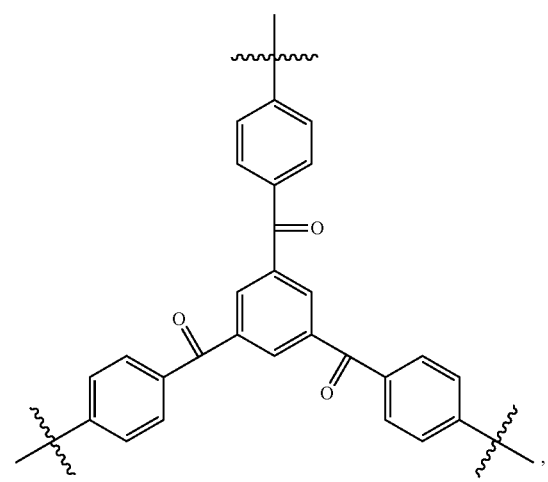

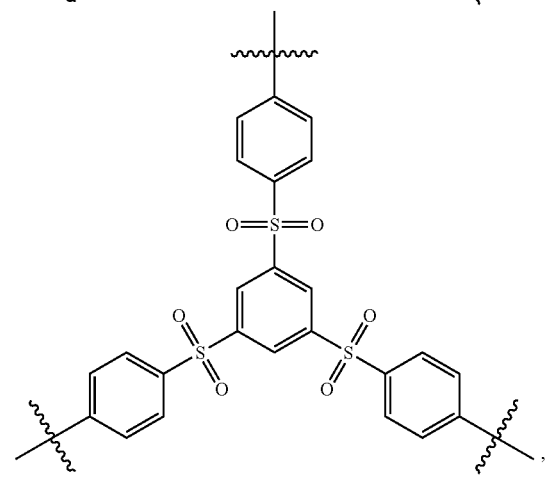

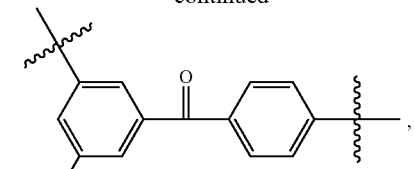

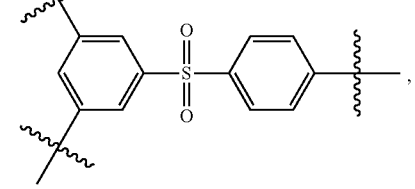

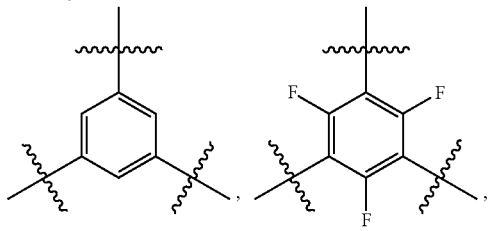

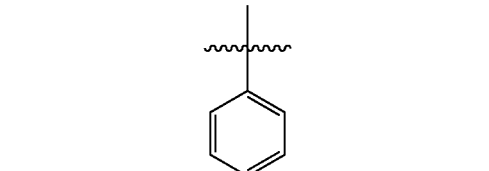

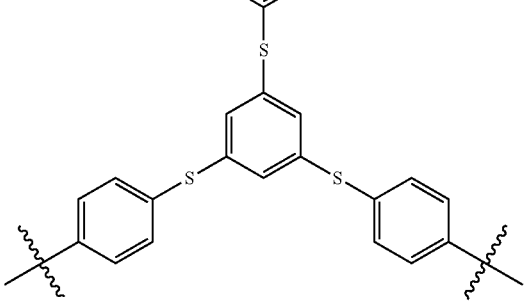

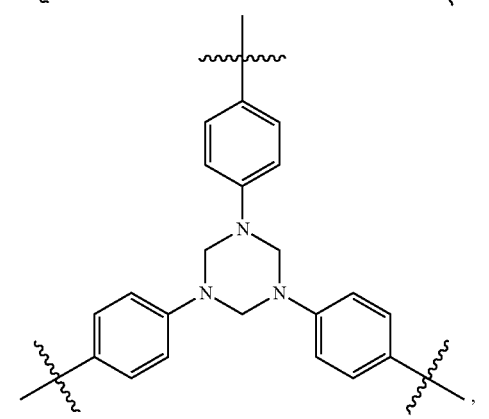

In one embodiment of the present specification, the polymer has a weight average molecular weight of 500 g/mol to 5,000,000 g/mol. When the polymer has a weight average molecular weight in the above-mentioned range, mechanical properties of an electrolyte membrane including the polymer do not decline, and proper polymer solubility is maintained, and therefore, the electrolyte membrane may be readily prepared.

In addition, one embodiment of the present specification provides a polymer electrolyte membrane including the polymer described above.

When including a polymer including the unit represented by Chemical Formula 1 according to one embodiment of the present specification, high mechanical strength and high ion conductivity are obtained, and phase separation of the electrolyte membrane may be readily accomplished.

In the present specification, the "electrolyte membrane" is a membrane capable of exchanging ions, and includes a membrane, an ion-exchange membrane, an ion-transfer membrane, an ion-conductive membrane, a separator, an ion-exchange separator, an ion-transfer separator, an ion-conductive separator, an ion-exchange electrolyte membrane, an ion-transfer electrolyte membrane, an ion-conductive electrolyte membrane or the like.

The polymer electrolyte membrane according to one embodiment of the present specification may be prepared using materials and/or methods known in the art except for including a polymer including the unit represented by Chemical Formula 1.

According to one embodiment of the present specification, the polymer electrolyte membrane has ion conductivity of 0.01 S/cm to 0.5 S/cm. In another embodiment, the polymer electrolyte membrane has ion conductivity of greater than or equal to 0.01 S/cm and less than or equal to 0.3 S/cm.

In one embodiment of the present specification, ion conductivity of the polymer electrolyte membrane may be measured under a humidity condition. A humidity condition in the present specification may mean relative humidity (RH) of 10% to 100%.

In addition, in one embodiment of the present specification, the polymer electrolyte membrane has an ion exchange capacity (IEC) value of 0.01 mmol/g to 5 mmol/g. When the polymer electrolyte membrane has an ion exchange capacity value in the above-mentioned range, ion channels are formed in the polymer electrolyte membrane, and the polymer may exhibit ion conductivity.

In one embodiment of the present specification, the polymer electrolyte membrane has a thickness of 1 μm to 500 μm. The polymer electrolyte membrane having the above-mentioned thickness range reduces electric short and electrolyte material crossover, and may exhibit an excellent cation conductivity property. When the thickness becomes too low, hydrogen ions are readily exchanged, however, problems such as mechanical strength weakening and/or an increase in the vanadium ion migration may occur. Within the above-mentioned range, proper mechanical strength may be maintained while readily exchanging hydrogen ions.

One embodiment of the present specification provides a reinforced membrane including a substrate; and the polymer described above.

In one embodiment of the present specification, the 'reinforced membrane' is an electrolyte membrane including a substrate, a reinforcing material, as a membrane capable of exchanging ions, and may mean a substrate-including membrane, ion-exchange membrane, ion-transfer membrane, ion-conductive membrane, separator, ion-exchange separator, ion-transfer separator, ion-conductive separator, ion-exchange electrolyte membrane, ion-transfer electrolyte membrane, ion-conductive electrolyte membrane or the like.

In the present specification, the substrate may mean a support having a three-dimensional network structure, and the reinforced membrane including the substrate and the polymer may mean the polymer being included in at least a part of one surface of the substrate, a surface opposite to the one surface and a pore region inside the substrate. In other words, the reinforced membrane of the present specification may be provided in a form of the polymer being impregnated in the substrate.

The polymer is the same as described above.

Hydrocarbon-based ion-transfer separators have problems in that an ion transfer ability is inferior compared to fluorine-based separators, and chemical resistance is weak. Accordingly, by including a polymer including the unit represented by Chemical Formula 1, the reinforced membrane according to one embodiment of the present specification has high mechanical strength and high ion conductivity, and phase separation of the reinforced membrane may be readily accomplished.

In addition, by including the substrate, the reinforced membrane according to one embodiment of the present specification enhances chemical resistance and durability, and thereby enhances a lifespan of a device.

In one embodiment of the present specification, one or two types from the group consisting of polypropylene (PP), polytetrafluoroethylene (PTFE), polyethylene (PE) and polyvinylidene fluoride (PVDF) are selected as the substrate.

In one embodiment of the present specification, the content of the polymer is from 10 parts by weight to 99 parts by weight with respect to 100 parts by weight of the reinforced membrane.

In another embodiment, the content of the polymer is from 10 parts by weight to 99 parts by weight and the content of the substrate is from 1 part by weight to 90 parts by weight, with respect to 100 parts by weight of the reinforced membrane. As the content of the substrate increases, a vanadium ion crossover may be reduced, and as the content of the polymer increases, battery performance may be enhanced.

Accordingly, when the content of the substrate and the polymer according to one embodiment of the present specification is in the above-mentioned range, a vanadium ion crossover may be reduced while maintaining battery performance.

According to one embodiment of the present specification, the reinforced membrane has ion conductivity of greater than or equal to 0.001 S/cm and less than or equal to 0.5 S/cm. In another embodiment, the reinforced membrane has ion conductivity of greater than or equal to 0.001 S/cm and less than or equal to 0.3 S/cm.

In the present specification, ion conductivity may be measured under the same condition as described above.

In addition, in one embodiment of the present specification, the reinforced membrane has an ion exchange capacity (IEC) value of 0.01 mmol/g to 5.0 mmol/g. When the reinforced membrane has an ion exchange capacity value in the above-mentioned range, ion channels are formed in the reinforced membrane, and the polymer may exhibit ion conductivity.

In one embodiment of the present specification, the reinforced membrane has a thickness of 0.01 μm to 10,000 μm. The reinforced membrane having the above-mentioned thickness range reduces electric short and electrolyte material crossover, and may exhibit an excellent cation conductivity property.

One embodiment of the present specification also provides a method for preparing a reinforced membrane including preparing a substrate; and impregnating the substrate into a polymer including the unit represented by Chemical Formula 1.

In the present specification, impregnation means a polymer infiltrating into a substrate. The impregnation in the present specification may be carried out by dipping the substrate into the polymer, slot die coating, bar casting and the like.

In the present specification, dipping may be expressed by terms such as dip coating or dipping method.

In one embodiment of the present specification, the reinforced membrane may have directivity. Specifically, in one embodiment of the present specification, the substrate may be prepared through monoaxial orientation or biaxial orientation, and directivity of the substrate obtained by the orientation may determine directivity of the reinforced membrane. Therefore, the reinforced membrane according to one embodiment of the present specification may have directivity in a machine direction (MD) and in a direction perpendicular to the machine direction (MD), and the reinforced membrane may exhibit differences in the physical properties such as stress and elongation depending on the directivity.

One embodiment of the present specification also provides a method for preparing a reinforced membrane including preparing a substrate; and dipping the substrate into the polymer.

In the present specification, the substrate and the polymer are the same as described above.

One embodiment of the present specification also provides a membrane-electrode assembly including an anode; a cathode; and the polymer electrolyte membrane described above provided between the anode and the cathode.

One embodiment of the present specification also provides a membrane-electrode assembly including an anode; a cathode; and the reinforced membrane described above provided between the anode and the cathode.

The membrane-electrode assembly (MEA) means an assembly of electrodes (cathode and anode) in which an electrochemical catalyst reaction of fuel and air occurs and a polymer membrane in which hydrogen ion transfer occurs, and is a single assembled unit in which electrodes (cathode and anode) and an electrolyte membrane are adhered.

The membrane-electrode assembly of the present specification has a form of a catalyst layer of an anode and a catalyst layer of a cathode being brought into contact with an electrolyte membrane, and may be prepared using common methods known in the art. As one example, the membrane-electrode assembly may be prepared through thermocompressing the cathode; the anode; and the electrolyte membrane located between the cathode and the anode at 100° C. to 400° C. while sticking these together.

The anode electrode may include an anode catalyst layer and an anode gas diffusion layer. The anode gas diffusion layer may again include an anode micropore layer and an anode electrode substrate.

The cathode electrode may include a cathode catalyst layer and a cathode gas diffusion layer. The cathode gas diffusion layer may again include a cathode micropore layer and a cathode electrode substrate.

FIG. 1 is a diagram schematically showing a principle of electricity generation of a fuel cell, and in the fuel cell, a most basic unit generating electricity is a membrane-electrode assembly (MEA), and this is formed with an electrolyte membrane (100), and anode (200a) and cathode (200b) electrodes formed on both sides of the electrolyte membrane (100). When referring to FIG. 1 showing a principle of electricity generation of a fuel cell, an oxidation reaction of fuel such as hydrogen, methanol, or hydrocarbon such as butane occurs in the anode (200a) to generate hydrogen ions ($H^+$) and electrons ($e^-$), and the hydrogen ions migrate to the cathode (200b) through the electrolyte membrane (100). In the cathode (200b), water is produced through the reaction of the hydrogen ions transferred through the electrolyte membrane (100), an oxidizer such as oxygen, and electrons. Electrons migrate to an external circuit through such a reaction.

The anode electrode catalyst layer is a place where an oxidation reaction of fuel occurs, and catalysts selected from the group consisting of platinum, ruthenium, osmium, platinum-ruthenium alloys, platinum-osmium alloys, platinum-palladium alloys and platinum-transition metal alloys may be preferably used. The cathode electrode catalyst layer is a place where a reduction reaction of an oxidizer occurs, and platinum or platinum-transition metal alloys may be preferably used as catalysts. The catalysts may be used as they are, or may be used while being supported on a carbon-based carrier.

The process of introducing the catalyst layer may be carried out using common methods known in the art, and for example, a catalyst ink may be directly coated on the electrolyte membrane, or coated on the gas diffusion layer to form the catalyst layer. Herein, the coating method of the catalyst ink is not particularly limited, and methods of spray coating, tape casting, screen printing, blade coating, die coating, spin coating or the like may be used. The catalyst ink may be typically formed with a catalyst, a polymer ionomer and a solvent.

The gas diffusion layer becomes a migration path of reaction gases and water while performing a role of a current conductor, and has a porous structure. Accordingly, the gas diffusion layer may be formed including a conductive substrate. As the conductive substrate, carbon paper, carbon cloth or carbon felt may be preferably used. The gas diffusion layer may be formed further including a micropore layer between the catalyst layer and the conductive substrate. The micropore layer may be used for enhancing fuel cell performance under a low humidity condition, and performs a role of allowing the electrolyte membrane to be under a sufficiently wet condition by having the amount of water escaping outside the gas diffusion layer being small.

One embodiment of the present specification provides a polymer electrolyte-type fuel cell including two or more membrane-electrode assemblies; a stack including a bipolar plate provided between the membrane-electrode assemblies; a fuel supplying unit supplying fuel to the stack; and an oxidizer supplying unit supplying an oxidizer to the stack.

In the present specification, the membrane-electrode assembly includes either the polymer electrolyte membrane or the reinforced membrane described above.

A fuel cell is an energy conversion device directly converting chemical energy of fuel into electric energy. In other words, a fuel cell employs a power generation method utilizing a fuel gas and an oxidizer, and using electrons generated during the oxidation and reduction reactions thereof to produce power.

The fuel cell may be prepared through common methods known in the art using the membrane-electrode assembly (MEA) described above. For example, the fuel cell may be prepared by forming with the membrane-electrode assembly (MEA) prepared above and a bipolar plate.

The fuel cell of the present specification is formed including a stack, a fuel supplying unit and an oxidizer supplying unit.

FIG. 3 is a diagram schematically illustrating the fuel cell, and the fuel cell is formed including a stack (60), an oxidizer supplying unit (70) and a fuel supplying unit (80).

The stack (60) includes one, two or more of the membrane-electrode assemblies described above, and when two or more of the membrane-electrode assemblies are included, a separator provided therebetween is included. The separator prevents the membrane-electrode assemblies from being electrically connected, and performs a role of transferring fuel and oxidizer supplied from the outside to the membrane-electrode assemblies.

The oxidizer supplying unit (70) performs a role of supplying an oxidizer to the stack (60). As the oxidizer, oxygen is typically used, and oxygen or air may be injected with a pump (70) to be used.

The fuel supplying unit (80) performs a role supplying fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may include methanol, ethanol, propanol, butanol or natural gas.

The fuel cell may include a polymer electrolyte fuel cell, a direct liquid fuel cell, a direct methanol fuel cell, a direct formic acid fuel cell, a direct ethanol fuel cell, a direct dimethyl ether fuel cell or the like.

When using the electrolyte membrane according to one embodiment of the present specification as an ion-exchange membrane of the fuel cell, effects described above may be obtained.

In addition, one embodiment of the present specification provides a redox flow battery including a positive electrode cell including a positive electrode and a positive electrode liquid electrolyte; a negative electrode cell including a negative electrode and a negative electrode liquid electrolyte; and the polymer electrolyte membrane according to one embodiment of the present specification provided between the positive electrode cell and the negative electrode cell.

Another embodiment provides a redox flow battery including a positive electrode cell including a positive electrode and a positive electrode liquid electrolyte; a negative electrode cell including a negative electrode and a negative electrode liquid electrolyte; and the reinforced membrane according to one embodiment of the present specification provided between the positive electrode cell and the negative electrode cell.

A redox flow battery (oxidation-reduction flow battery) is a system charged and discharged by active materials included in a liquid electrolyte being oxidized and reduced, and is an electrochemical storage device directly storing chemical energy of the active materials as electric energy. A redox flow battery uses a principle of being charged and discharged from the exchange of electrons occurring when liquid electrolytes including active materials in different oxidation states meet with an ion-exchange membrane in between. A redox flow battery is generally formed with a tank holding a liquid electrolyte, a battery cell where charge and discharge occur, and a circulating pump for circulating the liquid electrolyte between the tank and the battery cell, and a unit cell of the battery cell includes an electrode, an electrolyte and an ion-exchange membrane.

When using the electrolyte membrane according to one embodiment of the present specification as an ion-exchange membrane of the redox flow battery, effects described above may be obtained.

The redox flow battery of the present specification may be prepared using common methods known in the art except for including the polymer electrolyte membrane according to one embodiment of the present specification.

As illustrated in FIG. 2, the redox flow battery is divided into a positive electrode cell (32) and a negative electrode cell (33) by an electrolyte membrane (31). The positive electrode cell (32) and the negative electrode cell (33) include a positive electrode and a negative electrode, respectively. The positive electrode cell (32) is connected to a positive electrode tank (10) for supplying and releasing a positive electrode liquid electrolyte (41) through a pipe. The negative electrode cell (33) is also connected to a negative electrode tank (20) for supplying and releasing a negative electrode liquid electrolyte (42) through a pipe. The liquid electrolytes circulate through pumps (11, 21), and through an oxidation/reduction reaction (that is, a redox reaction) changing the oxidation number of ions, charge and discharge occur in the positive electrode and the negative electrode.

Hereinafter, the present specification will be described in detail with reference to examples. However, the examples according to the present specification may be modified to various other forms, and the scope of the present specification is not to be construed as being limited to the examples described below. Examples of the present specification are provided in order to more completely describe the present specification to those having average knowledge in the art.

Example 1

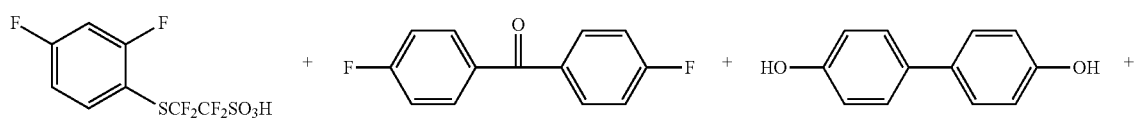

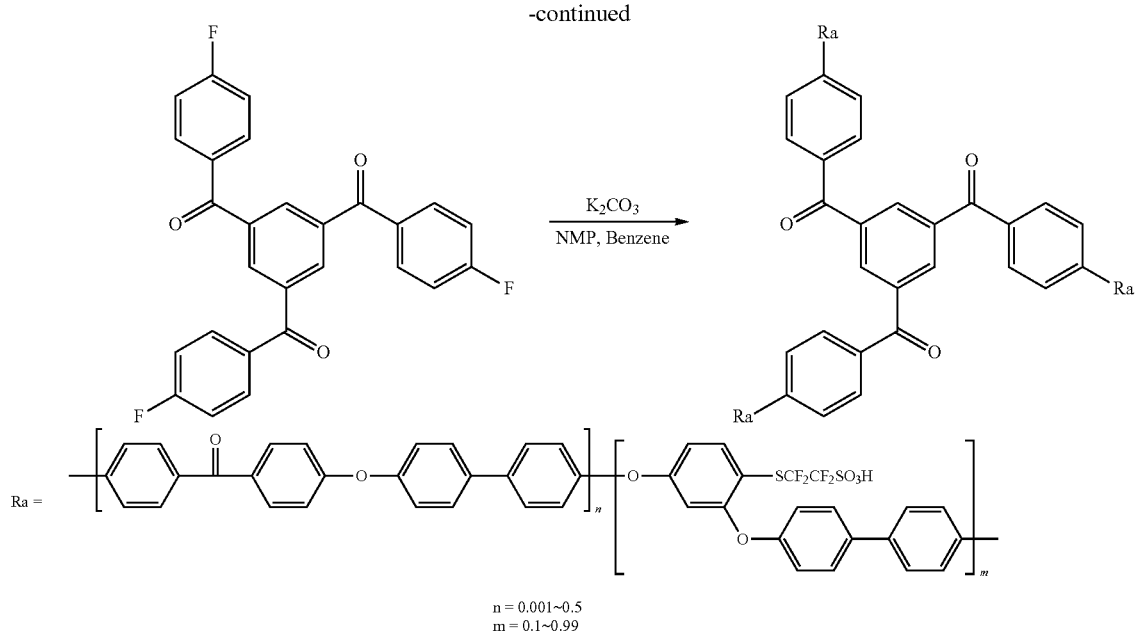

n = 0.001~0.5
m = 0.1~0.99

After dissolving 4,4'-difluorobenzophenone (0.45 g, 0.002067 mol), 2-((2,4-difluorophenyl)thio)-1,1,2,2-tetrafluoroethane-1-sulfonic acid (3 g, 0.009196 mol), benzene-1,3,5-triyl tris((4-fluorophenyl)methanone) (0.046 g, 0.000103 mol), potassium carbonate (5.7 g, 0.04133 mol) and 4,4'-biphenol (1.92 g, 0.010333 mol) in N-methyl-2-pyrrolidone (20 ml), the result was stirred for 4 hours at 140° C. using a dean stark trap to remove water. Herein, benzene was used as an azeotropic reagent. After that, the result was reacted for 19 hours at 180° C., the reaction was terminated and a resin was obtained.

Comparative Example 1

A hydrocarbon-based polymer was polymerized in the same manner as in Example 1, except that 2,5-dihydroxybenzenesulfonic acid was used instead of the unit represented by Chemical Formula 1 of the present specification, and 4,4'-(9H-fluorene-9,9-diyl)diphenol was used instead of [1,1'-biphenyl]-4,4'-diol.

FIG. 4 is a diagram showing ion conductivity of the example and the comparative example.

From the result of FIG. 4, ion conductivity of the polymer of the example was 4.4 mS/cm compared to ion conductivity of 0.56 mS/cm of the comparative example when relative humidity was 30%, and it was identified that performance was enhanced by approximately 8 times compared to the comparative example. Accordingly, it was identified that a polymer electrolyte membrane including the polymer according to one embodiment of the present specification had high ion conductivity.

Comparative Example 2

A polymer was attempted to be prepared in the same manner as in Example 1 using a monomer having a linker of a benzene ring and sulfonic acid as $SO_2$, however, obtaining a high molecular weight polymer was unsuccessful under the same condition. The molecular weight of the polymer was measured through gel permeation chromatography (GPC) and the results are shown in the following Table 1.

Comparative Example 3

A polymer was attempted to be prepared in the same manner as in Example 1 using a 2,5-difluoro partial fluorine-based monomer instead of a 2,4-difluoro partial fluorine-based monomer, the unit of Chemical Formula 1 of the present specification, however, obtaining a high molecular weight polymer was unsuccessful under the same condition. The molecular weight of the polymer was measured through gel permeation chromatography (GPC) and the results are shown in the following Table 1.

TABLE 1

| Partial Fluorine-based Membrane | Mn (g/mol) | Mw (g/mol) | Mw/Mn |
|---|---|---|---|
| Example 1 | 84,000 | 622,000 | 7.40 |
| Comparative Example 2 | N/A | N/A | N/A |
| Comparative Example 3 | N/A | N/A | N/A |

In Table 1, N/A means not available, and it was identified that the polymer was not formed.

Based on the results of Example 1 and Comparative Example 1, it can be identified that using an S atom as a linker of —[CR1R2]$_n$-A and a benzene ring in Chemical Formula 1 is advantageous in forming the polymer, and a stable polymer may be formed.

In addition, based on the results of Example 1 and Comparative Example 3, a monomer substituted with functional groups at 2,5 positions, which has been generally used in the art, has been commercially used without considering reactivity even when reactivity is very different during a polymerization reaction depending on the properties of functional group substituting other positions.

It can be identified that, by the functional group of Chemical Formula 1 hung as a pendant generally having an electron withdrawing characteristic, the 2,4-difluoro halogenated compound according to one embodiment of the present specification exhibits greatly enhanced reactivity during a polymerization reaction, which is advantageous in obtaining a high molecular weight polymer.

FIG. 5 is a diagram showing reactivity depending on the bonding position of the polymer of the present disclosure.

Based on the results of FIG. 5, it can be identified that reactivity is low when fluorine is provided at 2,5 positions of the benzene ring compared to when fluorine is provided at 2,4 positions of the benzene ring, and it can be identified that the energy difference is small after the substitution reaction in the case of 2,4 position, which is advantageous for the reaction.

Accordingly, it can be identified that the monomer represented by Chemical Formula 1 according to one embodiment of the present disclosure has favorable reactivity.

The invention claimed is:

1. A random polymer comprising:
a unit represented by the following Chemical Formula 1; and
a brancher unit represented by the following Chemical Formula 2 or a brancher unit represented by the following Chemical Formula 3:

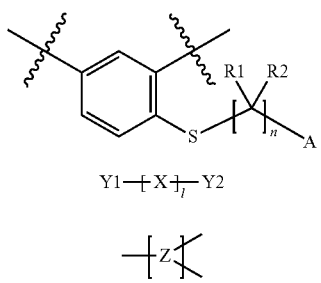

[Chemical Formula 1]

[Chemical Formula 2]

[Chemical Formula 3]

wherein, in Chemical Formulae 1 to 3,
A is —SO$_3$H, —SO$_3^-$M$^+$, —COOH, —COO$^-$M$^+$, —PO$_3$H$_2$, —PO$_3$H$^-$M$^+$, —PO$_3^{2-}$2M$^+$, —O(CF$_2$)$_m$SO$_3$H, —O(CF$_2$)$_m$SO$_3^-$M$^+$, —O(CF$_2$)$_m$COOH, —O(CF$_2$)$_m$COO$^-$M$^+$, —O(CF$_2$)$_m$PO$_3$H$_2$, —O(CF$_2$)$_m$PO$_3$H$^-$M$^+$ or —O(CF$_2$)$_m$PO$_3^{2-}$2M$^+$;
m is an integer of 2 to 6;
M is a group 1 element;
R1 and R2 are the same as or different from each other, and each independently a halogen group;
n is an integer of 2 to 10, and structures in the 2 to 10 parentheses are the same as or different from each other;
X is S; O; CO; SO; SO$_2$; NR; a hydrocarbon-based or fluorine-based assembly;
l is an integer of 0 to 10;
when l is 2 or greater, two or more Xs are the same as or different from each other;
Y1 and Y2 are the same as or different from each other, and each independently NRR; or an aromatic ring in which each aromatic ring has a first bond to a first adjacent substituent or a first main chain of the polymer and a second bond to a second adjacent substituent or a second main chain of the polymer;
R is an aromatic ring with a bond to an adjacent substituent or a main chain of the polymer; and
Z is a trivalent organic group.

2. The random polymer of claim 1, wherein A is —SO$_3$H or —SO$_3^-$M$^+$.

3. The random polymer of claim 1, wherein n is an integer of 2 to 6.

4. The random polymer of claim 1, wherein the unit represented by Chemical Formula 1 is represented by any one of the following Chemical Formulae 1-1 to 1-9:

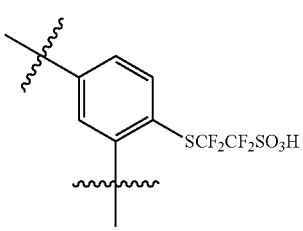

[Chemical Formula 1-1]

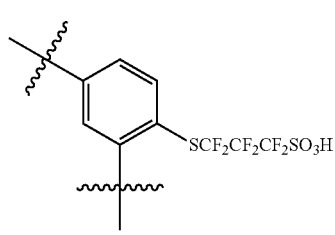

[Chemical Formula 1-2]

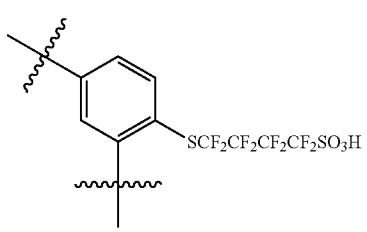

[Chemical Formula 1-3]

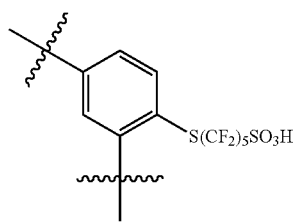

[Chemical Formula 1-4]

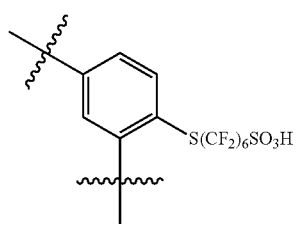

[Chemical Formula 1-5]

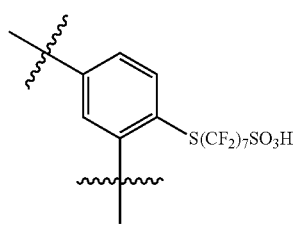

[Chemical Formula 1-6]

-continued
[Chemical Formula 1-7]
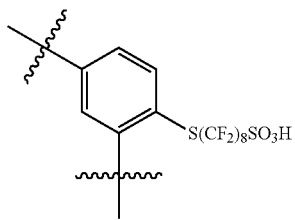
[Chemical Formula 1-8]
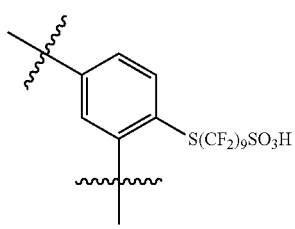
[Chemical Formula 1-9]
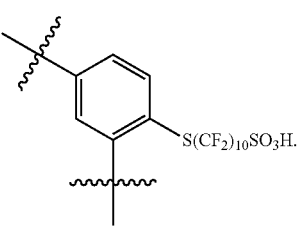
5. The random polymer of claim 1, wherein the brancher unit represented by Chemical Formula 3 is any one of the following structures:
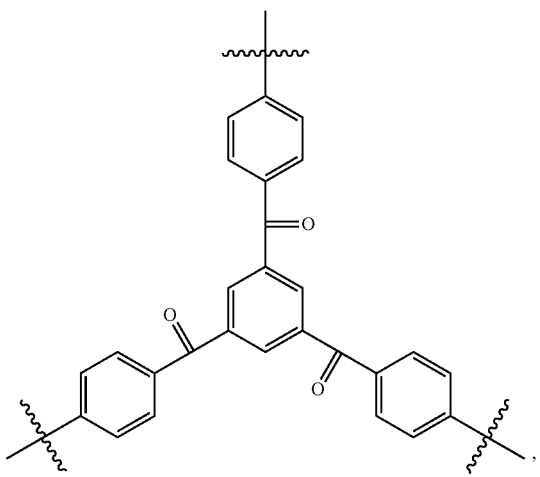
-continued
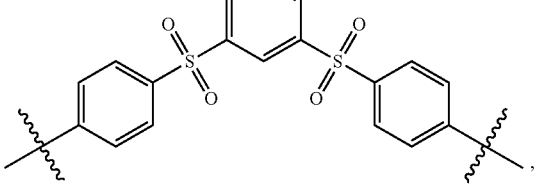
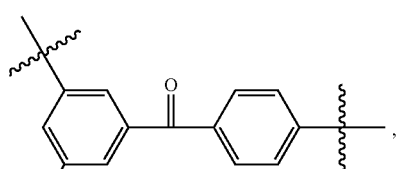
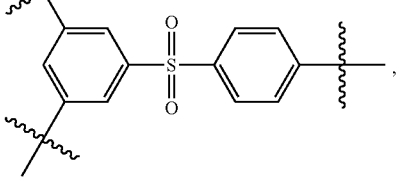
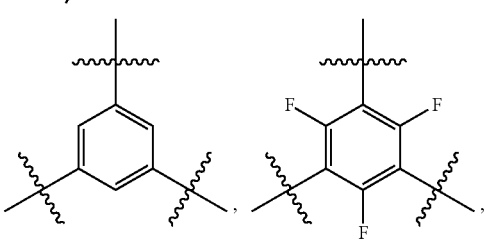
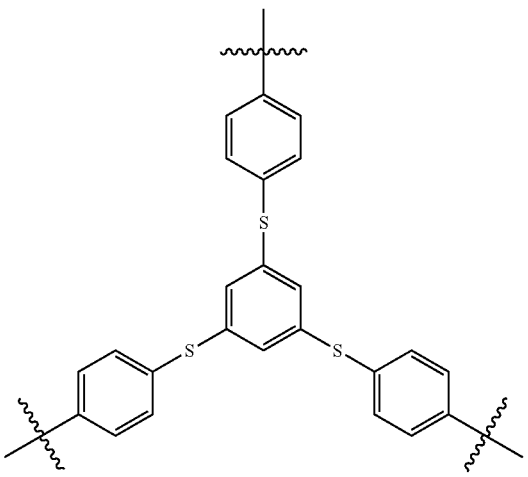

-continued

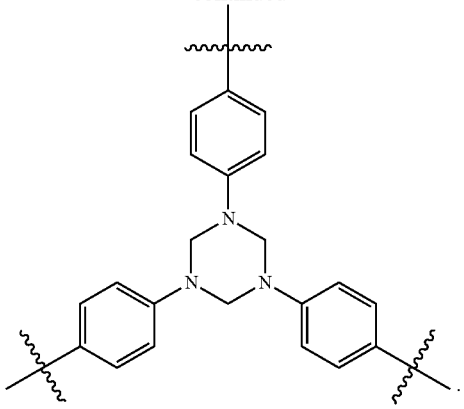

6. The random polymer of claim 1, which has a weight average molecular weight of 500 g/mol to 5,000,000 g/mol.

7. A polymer electrolyte membrane comprising the random polymer of claim 1.

8. A reinforced membrane comprising:
a substrate; and
the random polymer of claim 1.

9. The polymer electrolyte membrane of claim 7, which has ion conductivity of 0.01 S/cm to 0.5 S/cm.

10. The polymer electrolyte membrane of claim 7, which has an ion exchange capacity (IEC) value of 0.01 mmol/g to 5 mmol/g.

11. A membrane-electrode assembly comprising:
an anode;
a cathode; and
the polymer electrolyte membrane of claim 7 provided between the anode and the cathode.

12. A polymer electrolyte-type fuel cell comprising:
two or more of the membrane-electrode assemblies of claim 11;
a stack including a bipolar plate provided between the membrane-electrode assemblies;
a fuel supplying unit supplying fuel to the stack; and
an oxidizer supplying unit supplying an oxidizer to the stack.

13. A redox flow battery comprising:
a positive electrode cell including a positive electrode and a positive electrode liquid electrolyte;
a negative electrode cell including a negative electrode and a negative electrode liquid electrolyte; and
the polymer electrolyte membrane of claim 7 provided between the positive electrode cell and the negative electrode cell.

14. A membrane-electrode assembly comprising:
an anode;
a cathode; and
the reinforced membrane of claim 8 provided between the anode and the cathode.

15. A polymer electrolyte-type fuel cell comprising:
two or more of the membrane-electrode assemblies of claim 14;
a stack including a bipolar plate provided between the membrane-electrode assemblies;
a fuel supplying unit supplying fuel to the stack; and
an oxidizer supplying unit supplying an oxidizer to the stack.

16. A redox flow battery comprising:
a positive electrode cell including a positive electrode and a positive electrode liquid electrolyte;
a negative electrode cell including a negative electrode and a negative electrode liquid electrolyte; and
the reinforced membrane of claim 8 provided between the positive electrode cell and the negative electrode cell.

* * * * *